(No Model.)

H. F. OSBORNE.
HAND PRESS.

No. 294,802. Patented Mar. 11, 1884.

Attest:
William J. Gerth
Henry Theberath

Inventor:
H. F. Osborne per
Thos. S. Crane, Atty.

United States Patent Office.

HENRY F. OSBORNE, OF NEWARK, NEW JERSEY.

HAND-PRESS.

SPECIFICATION forming part of Letters Patent No. 294,802, dated March 11, 1884.

Application filed July 31, 1883. (No model.)

*To all whom it may concern:*

Be it known that I, HENRY F. OSBORNE, a citizen of the United States, residing in Newark, in the county of Essex and State of New Jersey, have invented certain new and useful Improvements in Hand-Presses, fully described and represented in the following specification and the accompanying drawings, forming a part of the same.

This invention consists in an improvement in hand-presses, whereby the substance under compression may be subjected to a rubbing or grinding action during the pressing operation, for the purpose of reducing or tearing the fibers thereof, and more fully exposing the cellular contents.

Figure 1:
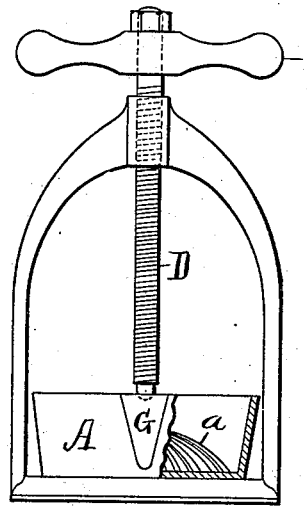
Figure 2:
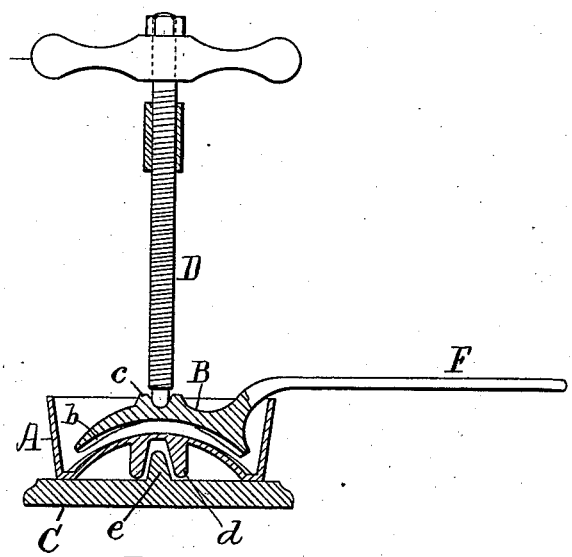
Figure 4:
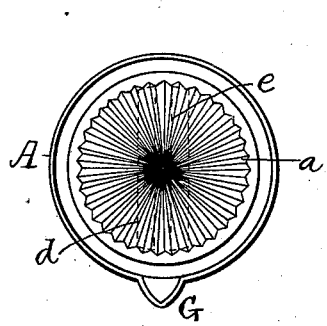
Figure 3:
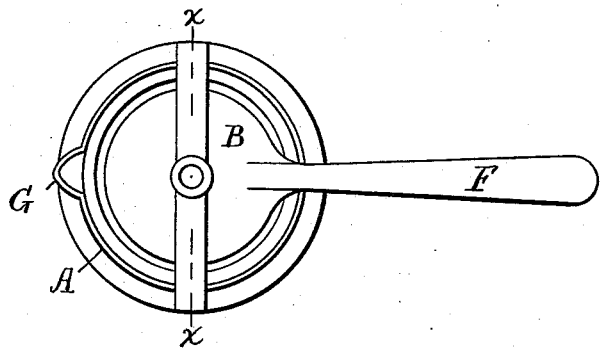

The construction will be understood from the annexed drawings, in which Figure 1 is a front view of my press constructed with a screw, and having the presser removed to insert the material or substance to be pressed. Fig. 2 is a side sectional view taken on the center line, $x\, x$, in Fig. 3, and the latter figure is a plan of the whole apparatus. Fig. 4 is a plan of the receptacle detached from the machine, especially to show the corrugations in its arched bottom.

In Fig. 1 a portion of the receptacle is broken away to show the arrangement of the corrugations.

The invention is especially adapted to extracting the juice from meat, as such substance is very fibrous and tenacious and sustains great pressure without the rupture of its tissues; and my construction is designed to subject the meat simultaneously to a pressing and a grinding or triturating action, that the particles may be effectually disintegrated and compressed. For this purpose I construct my press with a cup or receiver, A, to hold the meat, and provide corrugations $a$ in or upon its bottom. I provide a presser, B, adapted to fit inside the receiver and rest upon the meat, and having corrugations $b$ upon its lower side in contact with the meat. The receiver and presser are inclosed in a suitable frame, C, by which they are subjected to the pressure of a screw, D, the top of which projects above the frame, and is provided with a handle, E, to turn it. The presser B is also constructed with a handle, F, projected beyond the side of the receiver, for turning it during the pressing operation, and with a boss, $c$, upon its upper side, having a recess or depression to fit the point of the screw.

It is obvious that with the construction shown the cup or receiver may have a supply of meat put in it, and the presser be placed thereon and worked back and forth by the handle F, while the screw D is forced gradually downward by turning its own handle E. Such pressure and rubbing upon the meat reduces it gradually to a fine pulp, while the juice is discharged freely and accumulates in the receiver above the presser. To pour off the juice readily, the receiver is formed with a spout, G, at one side, and to permit of its being readily cleaned it is preferably made detachable from the frame C, as shown in the drawings. The bottom of the receiver is shown of convex form and arched upward, to expose a greater surface and to inclose the meat more closely, and the presser is made of corresponding shape; but such contour is not an essential part of the invention.

To keep the receiver from turning around inside the frame when the presser is oscillated back and forth, a rib, $e$, is formed upon the base of the frame, and ribs $d\, d$ are formed under the bottom of the receiver to engage therewith. In lieu of these ribs, lugs may be provided on the sides of the receiver to engage with the uprights of the frame C, the latter consisting of a base and two upright bars united by an arch at the top, through which the screw is inserted.

My invention is especially adapted to the extracting of beef-juice from beef for invalids, and is designed to perform such operation more effectually and easily than the lemon-squeezers frequently used for the purpose. As such extract requires to be entirely fresh for the use of invalids, I have designed the apparatus described for domestic use, and either galvanize or enamel the parts exposed to the action of the meat-juice, so that the same may be perfectly cleansed with water.

As the essential part of the invention is the combination of the means for pressing and triturating the meat at the same time, I do not limit myself to the precise construction shown. The receiver may, if preferred, be made integral with the frame of the pressing apparatus, and the latter may consist of a lever instead of a screw, to induce the required pressure. In such case the frame would need no arch at the top; but the lever could be pivoted thereto at one side, and be provided with a pin to press upon the boss $c$ on top of the presser.

Having thus fully described the nature and objects of my invention, I do not specify any particular proportions for the apparatus, or degree of fineness for the corrugations which disintegrate the substance to be pressed, as the invention may be applied to other purposes than that specified, and may be constructed as required for the circumstances of each case. The action of the oscillating presser B may thus suffice to produce the desired effect in certain instances without the use of any corrugations whatever; and I have therefore claimed such a presser separately, as follows:

1. The combination, with the receiver and presser, of means, substantially as described, for pressing them together, substantially as and for the purpose set forth.

2. The combination of a receiver having corrugations $a$, a presser having corrugations $b$, and provided with handle F, and means, substantially as described, for pressing them together, as and for the purpose set forth.

3. The combination, with the frame C, provided with screw D, of the removable receiver A, provided with means to hold it from turning in the frame, and a removable presser, B, provided with a handle for oscillating it, substantially as shown and described.

In testimony whereof I have hereunto set my hand in the presence of two subscribing witnesses.

HENRY F. OSBORNE.

Witnesses:
 THOS. S. CRANE,
 JOHN A. RODRIGO.